April 19, 1966 P. C. MASON 3,246,347
COMBINATION SEAT AND BED
Filed July 2, 1962 2 Sheets-Sheet 1

INVENTOR.
PETER C. MASON
BY
ATTORNEYS

April 19, 1966 P. C. MASON 3,246,347
COMBINATION SEAT AND BED
Filed July 2, 1962 2 Sheets-Sheet 2

INVENTOR.
PETER C. MASON
BY
Hauke & Hauke
ATTORNEYS

United States Patent Office 3,246,347
Patented Apr. 19, 1966

3,246,347
COMBINATION SEAT AND BED
Peter C. Mason, 438 E. Main St., Blanchard, Mich.
Filed July 2, 1962, Ser. No. 206,659
13 Claims. (Cl. 5—9)

This invention relates to seat-bed combinations and more particularly to a device for van type vehicles which can be readily converted from a seat means to a double bunk type bed.

Heretofore seats have been provided for van type vehicles which will convert to a bed somewhat suitable for sleeping four or five people. These, however, have been arranged so that when they are in a seating position passengers would be facing the side of the vehicle. Further, these arrangements have failed to utilize all the available space in such vehicles to provide means for comfortably sleeping four or five passengers.

It is an object of the present invention to produce an improved seat for van type vehicles by providing a seat-bed combination which will convert from a three passenger seat facing the front of the vehicle to a four or five passenger bed arrangement.

It is a further object of the present invention to provide means for sleeping four or five passengers in a van type vehicle by providing a seat for such a vehicle which will readily convert into a double bunk bedding arrangement.

It is still a further object of the present invention to provide improved sleeping means for van type vehicles by providing a double bunk bed for such a vehicle having a portion which may be readily adjusted to form the back rest for a three passenger seat during travel.

Still further objects and advantages will be readily apparent to one skilled in the art to which the invention pertains upon reference to the following drawings in which like characters refer to like parts throughout the several views and in which FIG. 1 is an elevational view partially cut away and illustrating a preferred embodiment of the present invention installed in a van type vehicle.

Figure 1:
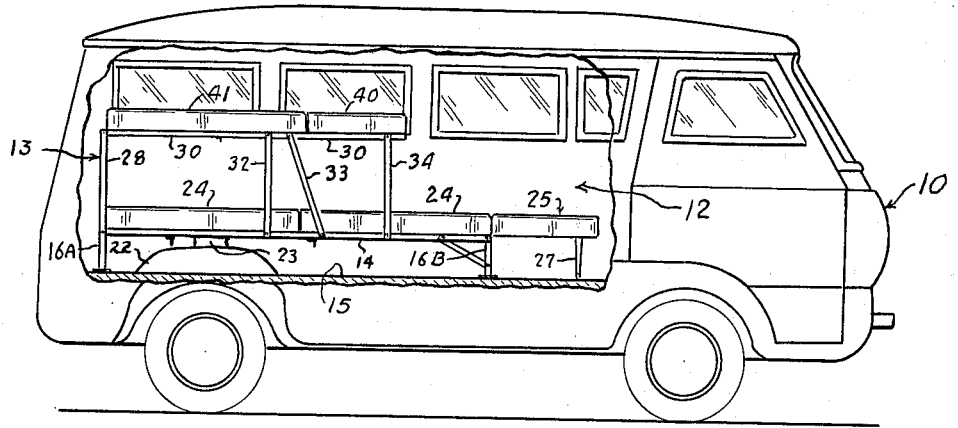

Now referring to the drawings for a more detailed description of the present invention, FIG. 1 shows a well known van type vehicle 10 as having a rear area 12. The seat-bed combination 13 of the present invention is adapted to be carried in this area and may be constructed to fit within most of the many models of small van type vehicles now being sold.

The seat-bed combination 13 preferably comprises a rectangularly constructed frame structure 14 carried in a position vertically spaced from and substantially parallel to the floor 15 of the vehicle 10 by leg members 16A and 16B. The frame structure 14 preferably is constructed of angle members 17 secured together by any means such as bolts 18. Corner braces 19 are provided to maintain the leg members 16A and 16B in squared position. Longitudinally spaced cross members 20 also may be included to provide support for the frame structure 14. Preferably rubber pads 21 mounted on the leg members 16A and 16B resist relative movement between the floor 15 and the frame structure 14. It is apparent that if more permanency is desirable any convenient means could be provided for securing the leg members 16A and 16B to the floor 15. In the preferred embodiment illustrated, the frame structure 14 has a longitudinal medial portion adapted to be supported by the wheel wells 22 of the vehicle 10 and for this purpose pads 23 are provided on the angle members 17 to engage the wheel wells 22.

The frame structure 14 preferably carries a pair of substantially similar pad members or cushions 24.

A padded extension member 25 is adapted to be removably secured to the frontwardly facing edge of the frame structure 14 by any convenient means such as bolt members 42 which may be positioned with the head portions spaced outwardly from the frame structure 14 and conventional matching slotted members 43 having portions for insertion over the bolts 42 may be provided on the extension member 25. Removable legs 27 are provided on the extension member 25 to provide additional support.

The leg members 16A have portions 28 extending upwardly beyond the pad members 24 to provide support for one end of a second frame structure 29. The frame structure 29 is preferably rectangular and is constructed of angle members 30. The leg members 16A are preferably bolted as at 31 to a pair of adjoining angle members 30.

Figures 2, 4:
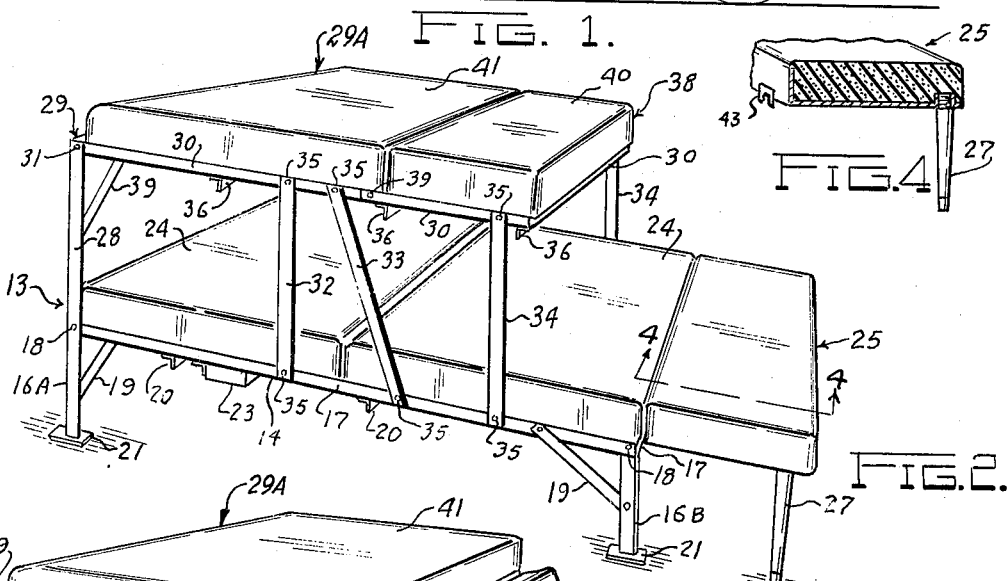
FIG. 2 is a perspective view of a preferred embodiment of the present invention and illustrating the bed position of the device.
FIG. 4 is a cross sectional view taken substantially on the line 4—4 of FIG. 2.

When the device is in the bed position as illustrated in FIGS. 1 and 2, support members 32, 33 and 34 removably secure the second frame structure 29 to the first frame structure 14 and maintain the same in a substantially parallel relationship with the first frame structure 14 and the floor 15 of the vehicle 10. Bolts 35 permit removal of the support members 32, 33, 34. Cross members 36 and corner supports 39 are provided for the frame structure 29.

The frame structure 29 is preferably comprised of a fixed portion 29A and a portion 38 which is pivotally secured to the fixed portion 29A as at 39 on a line spaced from and parallel to the end thereof. A pad member or cushion 40 is carried on the portion 38 and is secured thereto. A pad member 41 is carried on the fixed portion 29A of the frame structure 29.

Figure 3:
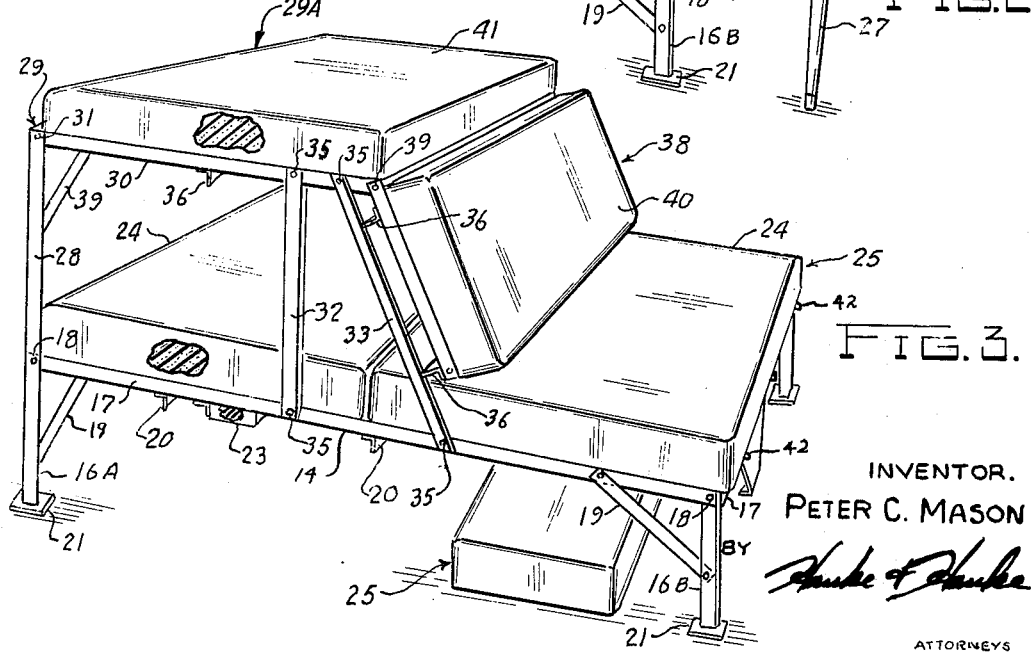
FIG. 3 is a perspective view of a preferred embodiment of the present invention illustrated in the seat position.

FIGS. 1 and 2 illustrate the device assembled for sleeping. When it is desired to convert to the seating arrangement the support members 34 are removed allowing the portion 38 of the second frame structure 29 to pivot downwardly into engagement with one of the padded members 24, as illustrated in FIG. 3. It will be noted that the support members 33 are sloped with respect to the planes of the frame structures 14 and 29 and are positioned to provide a support for the downwardly pivoted portion 38, whose cross members 36 engage the members 33. The extension member 25 may then be removed, the legs 27 removed, and the whole stored under the frame structure 14 as shown in FIG. 3. The bed arrangement illustrated in FIGS. 1-2 has now been converted to a three passenger seat facing the front of the vehicle as shown in FIG. 3.

Figure 5:
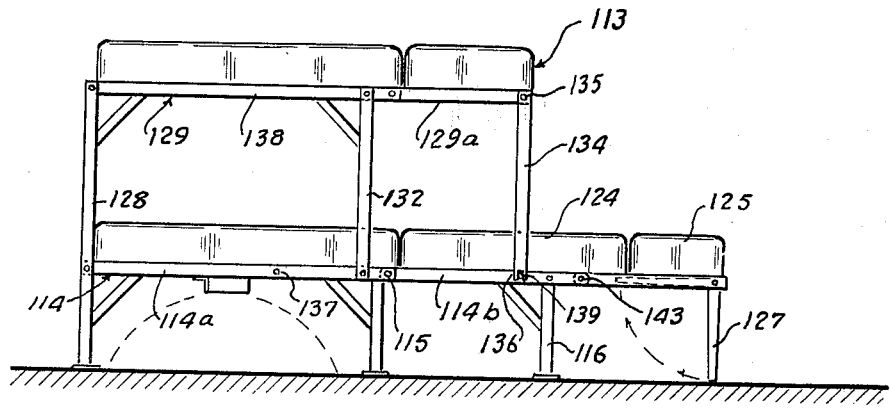
FIG. 5 is an elevational side view of another preferred embodiment illustrating the bed position.
Figure 6:
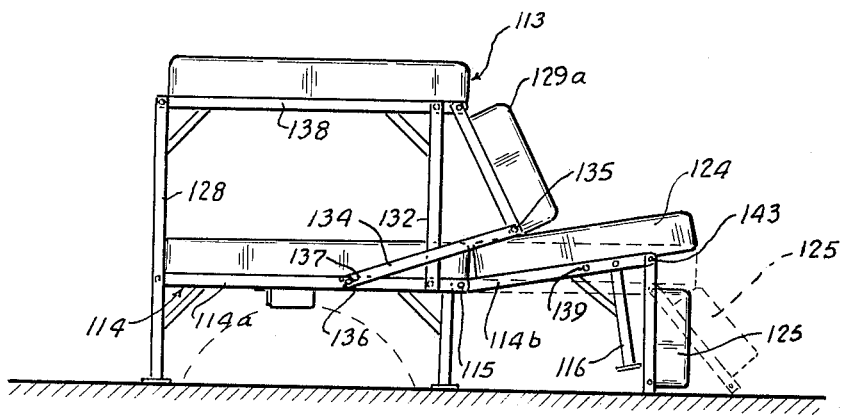
FIG. 6 is an elevational side view of the preferred embodiment shown in FIG. 5 but illustrating the device in the seat position.

FIGS. 5 and 6 illustrate another seat bed combination 113 substantially similar to the seat bed combination 13 described above but utilizing a construction which eliminates the need for support members 33.

The bottom frame structure 114 preferably comprises a fixed portion 114a and a portion 114b which is pivotally secured to the fixed portion 114a as at 115. A pad member 124 is carried on the upper portion 114b and is secured thereto.

The upper frame structure 129 has a pivotal portion 129a and a fixed portion 138 and is supported by support members 128, 132 and 134. The support member 134 is pivotally secured to the portion 129a as at 135 and has at its free end a slot 136. The frame structure 114 is provided with pairs of pins 137 and 139 which are adapted to receive and retain the slotted end of the support member 134.

A padded extension member 125 is pivotally carried on the frame portion 114b as at 143. The frame portion 114b is provided with legs 116 slightly less in length than the length of the extension member 125 so that when the extension member 125 is pivoted into the position illustrated in FIG. 6, the legs 116b are out of engagement with the floor of the vehicle and the portion 114b is tilted upwardly from the plane of the horizontal as shown. The extension member 125 is provided with removable legs 127.

To change the seat-bed combination 113 from the bed position shown in FIG. 5, to the seat position shown in FIG. 6, the support members 134 are moved out of engagement with the pins 139 and are positioned to be retained by the pins 137. The pins 137 are spaced from the pins 139 a distance which produces the desired slope of the portion 129a to provide a comfortable backrest. The legs 127 of the extension member 125 are then removed and the extension member 125 will pivot to the dotted line position indicated in FIG. 6 to form a leg rest or to the solid line position shown to slightly tilt the portion 114b to produce a comfortable reclining seat facing the front of the vehicle.

Although I have described two embodiments of the present invention, it is apparent that other changes and modifications can be made without departing from the spirit of the invention or the scope of the appended claims.

I claim:
1. A seat-bed combination for van type vehicles and the like comprising
   (a) a first bed member carried in a horizontally flat position,
   (b) a second bed member carried in a position vertically spaced from and overlying a portion of said first bed member,
   (c) said second bed member comprising a horizontally fixed portion and an end portion pivotally connected with said fixed portion on an axis spaced from and parallel to one end of said second bed member,
   (d) the distance from said axis to the end of said end portion being greater than the vertical distance between said bed members whereby downward pivotal movement of said end portion brings said end portion into engagement with said first bed member to form a backrest for a seat formed by said first bed member, and
   (e) means selectively operable to retain said end portion in a horizontal position whereby said first bed member and said second bed member provide a bunk-bed type arrangement.
2. The combination as defined in claim 1 and including pad members carried on said bed members.
3. The combination as defined in claim 2 and including a padded extension member pivotally connected to the seat portion of said first bed member and means selectively retaining said extension member in a horizontal position.
4. A seat bed combination for van-taype vehicles and the like comprising
   (a) a first elongated bed member adapted to be carried in a vehicle in a horizontally flat position with the longitudinal axis thereof substantially parallel with the longitudinal axis of said vehicle.
   (b) a second elongated bed member carried in a position vertically spaced from and overlying said first bed member,
   (c) said second bed member comprising a portion carried in a fixed position with respect to said first bed member and an end portion pivotally connected with said fixed portion on an axis substantially normal to the longitudinal axes of said bed members,
   (d) the distance from said pivotal axis to the end of said end portion being greater than the vertical distance between said bed members whereby downward pivotal movement of said end portion brings said end portion into engagement with said first bed member to form a backrest for a laterally extending seat formed by a portion of said first bed member,
   (e) means selectively operable to retain said end portion in a horizontal position whereby said bed members provide a bunk type bed arrangement extending longitudinally with respect to the longitudinal axis of said vehicle.
5. The combination as defined in claim 4 and including a padded extension member removably secured to the seat portion of said first bed member and being disposed in a common plane therewith.
6. The combination as defined in claim 4 and including a padded extension member pivotally connected to the seat portion of said first bed member and means selectively retaining said extension member in a common plane with said seat portion.
7. A seat-bed combination for van type vehicles and the like comprising
   (a) a first elongated bed member adapted to be carried in a vehicle in a horizontally flat position with the longitudinal axis thereof substantially parallel with the longitudinal axis of said vehicle,
   (b) a second elongated bed member carried in a position vertically spaced from and overlying said first bed member,
   (c) said second bed member comprising a portion carried in a fixed position with respect to said first bed member and a portion at the forward end of said second bed member with respect to said vehicle pivotally connected with said fixed portion on an axis substantially normal to the longitudinal axis of said bed members,
   (d) the distance from said pivoted axis to the end of said end portion being greater than the vertical distance between said bed members whereby downward pivotal movement of said end portion brings said end portion into engagement with said first bed member to form a backrest for a laterally extending forwardly facing seat formed by a portion of said first bed member,
   (e) means selectively operable to retain said end portion in a horizontal position whereby said bed members provide a bunk type bed arrangement extending longitudinally with respect to the longitudinal axis of said vehicle.
8 The combination as defined in claim 7 and including an extension member removably secured to the forward edge of the seat portion of said first bed member and being disposed in a common plane therewith.
9. The combination as defined in claim 7 and including an extension member pivotally connected to the forward edge of the seat portion of said first bed member and means selectively retaining said extension member in a common plane with said seat portion.
10. The combination as defined in claim 1 and including a padded extension member removably secured to one end of said first bed member and being disposed in a common plane therewith.
11. A seat-bed combination for van type vehicles and the like comprising
   (a) a first elongated rectangular frame structure adapted to be carried in said vehicle in position with the longitudinal axis thereof substantially parallel with the longitudinal axis of said vehicle,
   (b) a plurality of leg members carrying said first frame structure in a horizontal position spaced from the floor of said vehicle,

(c) a second elongated rectangular frame structure and means supporting said second frame structure in a horizontal position vertically spaced from said first frame structure with the longitudinal axis parallel to the longitudinal axis of said first frame structure and overlying a portion of said first frame structure, (d) a plurality of rectangular pad members carried on said first and second frame structures, (e) said second rectangular frame structure having a portion carried in a fixed position by said support means and an end portion carrying one of said pad members and being pivotally fixed to one end of said fixed portion on a line extending substantially normal to the longitudinal axis of said second frame structure and spaced from one end of said second frame structure.

(f) said end portion being operable upon removal of a portion of said support means to pivot downwardly into engagement with one of said pad members carried by said first frame structure whereby to convert said frame structures from a longitudinally extending bunk type bed arrangement to a laterally extending seating arrangement.

12. The combination as defined in claim 11 and including (a) a rectangular padded extension removably secured to one end of said first frame structure and being disposed in a substantially common plane therewith, (b) said extension being provided with removable leg members adapted to support said extension from the floor of said vehicle.

13. The combination as defined in claim 11 and in which said second frame supporting means includes at least a pair of support members sloped with respect to said first and second frame structures and positioned to engage said pivotally mounted portion of said second frame structure when same is in the downwardly pivoted position.

References Cited by the Examiner

UNITED STATES PATENTS

| | | | |
|---|---|---|---|
| 1,036,038 | 8/1912 | Vosler | 297—62 X |
| 1,247,840 | 11/1917 | Jackman | 297—62 X |
| 2,774,976 | 12/1956 | Ross | 5—9 |
| 2,828,802 | 4/1958 | Maurer | 297—462 X |
| 2,854,672 | 10/1958 | Hagstrom | 5—9 |
| 2,891,255 | 6/1959 | Simmons | 5—9 |
| 2,962,086 | 11/1960 | Waltimyer | 297—439 X |

FOREIGN PATENTS

| | | |
|---|---|---|
| 545,235 | 5/1942 | Great Britain. |
| 657,945 | 9/1951 | Great Britain. |

FRANK B. SHERRY, *Primary Examiner.*